United States Patent [19]

Suryanarayana et al.

[11] 3,867,382
[45] Feb. 18, 1975

[54] PROCESS FOR THE PRODUCTION OF CYANURIC CHLORIDE

[75] Inventors: Yelagondahally S. Suryanarayana; Luther J. Reid, Jr., both of Mobile, Ala.

[73] Assignee: Ciba-Geigy Corporation, Ardsley, N.Y.

[22] Filed: July 24, 1973

[21] Appl. No.: 382,245

Related U.S. Application Data

[63] Continuation of Ser. No. 142,359, May 11, 1971, abandoned.

[52] U.S. Cl............................................ 260/248 C
[51] Int. Cl............................................ C07d 55/42
[58] Field of Search ............................... 260/248 C

[56] References Cited
FOREIGN PATENTS OR APPLICATIONS
47-25187  10/1972  Japan

*Primary Examiner*—John M. Ford

[57] ABSTRACT

A process for the production of cyanuric chloride by trimerizing cyanogen chloride in the vapor phase using an activated carbon catalyst obtained from coconut shell.

2 Claims, No Drawings

3,867,382

PROCESS FOR THE PRODUCTION OF CYANURIC CHLORIDE

CROSS-REFERENCE TO RELATED APPLICATIONS

This is a continuation of application Ser. No. 142,359 filed May 11, 1971, now abandoned.

STATEMENT OF INVENTION

The present invention relates to a process for the production of cyanuric chloride and more particularly to the process for the production of cyanuric chloride by the trimerization of cyanogen chloride in the vapor phase employing, as a catalyst, an activated carbon obtained from coconut charcoal.

DESCRIPTION OF THE PRIOR ART

It is well known in the art that cyanuric chloride is an important chemical compound. It is used in the production of many important industrial products such as, for example, in the production of herbicides, optical brighteners, dyes, resins, plastics, and other like materials.

It is also well known in the art that cyanuric chloride can be prepared from cyanogen chloride in the presence of chlorine in the vapor phase using carbon charcoal, or other materials containing carbon as the catalyst wherein the carbon is derived from petroleum coke. In order to lower the cost in the production of this important chemical agent, many improvements have been made to increase the yield and to lower production costs. For example, U.S. Pat. No. 3,312,697 attempts to improve the conversion rate of cyanogen chloride to cyanuric chloride by employing a carbon catalyst which has been previously treated with an acid. U.S. Pat. No. 3,018,288 represents another attempt to improve the conversion of cyanogen chloride. Again, in this last mentioned patent, a pretreated carbon catalyst is used. While using these pretreated catalysts, the conversion rate of cyanogen chloride may be improved but the process becomes more expensive because pretreating the commercially available carbon catalyst requires at least one additional step as well as additional equipment. This represents an additional expense in the process for the production of cyanuric chloride.

DETAILED DESCRIPTION OF THE INVENTION

We have now found that extremely high yields, i.e., as high as 97 percent of cyanuric chloride in high purities, i.e., practically a pure white cyanuric chloride product can be obtained by employing carbon catalysts obtained from coconut charcoal. More specifically, we have found that high yields and high quality cyanuric chloride can be obtained from the trimerization of cyanogen chloride employing untreated coconut charcoal, i.e., the catalyst has not been acid washed. The untreated commercially available coconut charcoal catalysts generally contain various amounts of impurities such as metal oxides and salts and have a total ash content of 1.8 to 4.0 percent and suitably about 2 percent. Generally the ash content will be below about 4.0 percent. In order to achieve the high rate conversion and high purity of the resulting product, it is desirable that these catalysts have an inner surface area of from about 1,200 to 1,500 sq. meters per gram as measured by the BET method, and an internal micropore volume of at least 0.7 cc/gram, illustratively about 1.0 cc/gram.

This micropore volume is defined as the volume of pores with a diameter of less than 1000 angstroms.

The conditions of trimerization are well known in the art and do not per se form a portion of the present invention. Illustrative of prior art patents in the trimerization technique are U.S. Pat. Nos. 3,312,697 and 3,018,288. Rather, the present disclosure is directed to employment of a specific catalyst novel in the art in the trimerization process.

We have found quite surprisingly and unexpectedly that contrary to what is taught in the art using the nontreated, commercially available catalyst, pure cyanuric chloride can be produced in the vapor phase in excellent yields over long time periods. For example, 95 to 97 percent conversion of cyanogen chloride is generally obtained with maintenance of high conversion for an extended and desirable interval.

The use of the catalyst derived from coconut shell is a direct substitute for the acid washed petroleum coke derived catalyst known in the art. The catalyst derived from coconut shell is considered to possess catalytic activity and life similar to the acid washed carbon catalyst of the prior art. Yet the catalyst of the present disclosure is not acid washed or treated to obtain a comparable catalyst efficiency. Both the catalyst of the present disclosure and the acid washed carbon catalyst of the prior are vastly superior to known carbon catalysts which are not acid washed.

It is theorized that acid washing of petroleum derived prior art carbon catalyst removes heavy metals such as nickel, copper, chromium, etc., and the acid treatment aids this removal of the metals which in turn increases the ability of the material to catalyze the cyanogen chloride trimerization.

However, carbon derived from coconut shell is from plant material and in comparison with petroleum derivatives will not contain the levels of the heavy metals. Therefore, the acid washing is unnecessary to reduce the heavy metal concentration.

While the above theory is set forth only to illustrate reasoning why acid washing is superfluous for coconut derived carbon, nevertheless, it does aid in offering an explanation of the reason coconut derived carbon can serve as a comparable catalyst to acid washed petroleum derived catalyst.

An example of a commercial activated carbon catalyst which can be used is manufactured by the Pittsburgh Carbon Company and is referred to as PCB activated carbon. This material is made from selected grades of coconut shells and has been used in the vapor adsorption field and particularly in a solvent recovery system. The properties of this catalyst are as follows:

PHYSICAL PROPERTIES

| | |
|---|---|
| Total Surface Area ($N_2$, BET Method), $m^2/g$ | 1150–1250 |
| Apparent Density (Bulk Density, dense packing), g/cc | 0.45 |
| Particle Density (Hg Displacement), g/cc | 0.850 |
| Real Density (HE Displacement), g/cc | 2.2 |
| Pore Volume (Within Particle), cc/g | 0.72 |
| Voids in Dense Packed Column, % | 50.0 |
| Specific Heat at 100°C | 0.25 |

SPECIFICATIONS

| | |
|---|---|
| Iodine Number, mg/g minimum | 1200 |
| Carbon Tetrachloride Adsorption, Weight, % minimum | 60 |
| Ash, Maximum, % | 4.0 |
| Moisture, Maximum, % as packed | 3.0 |
| Hardness Number, minimum | 92 |
| Apparent Density (Bulk Density, dense packing), g/cc., minimum | 0.44 |
| lb/ft$^3$ | 27.5 |

Another suitable catalyst is manufactured by the Union Carbide Corporation and is designated as TS-987 having the following properties:

| | |
|---|---|
| Carbon Tetrachloride Activity, % | 64.0 |
| Carbon Tetrachloride Retentivity, % | 38.0 |
| Density, g/cc | 0.505 |
| Ash, % | 2.84 |

To further illustrate the innovative aspects of the present invention, the following example is provided:

A comparison of the coconut derived, non-acid wash trimerization catalyst of the present disclosure and conventional petroleum coke derived, acid washed catalyst was made. This activity is defined in the present context as the weight of cyanogen chloride trimerized per hour at 70 percent conversion per unit weight of the catalyst (F/W hr$^{-1}$). The 70 percent conversion was chosen to obtaine high accuracy in comparison of test data. The activity of the catalyst was measured, which is the catalyst activity as initially employed in the cyanuric chloride production. This activity changes with aging, particularly in initial useage, so to obtain a comparison the catalyst was employed at a trimerization temperature of 370°C for 48 hours after which the temperature was elevated to 500°C for 24 hours. At the end of this time, the temperature was decreased to 370°C and the catalyst activity was again measured.

| Catalyst | 'Fresh' Activity Activity (F/W hr$^{-1}$) at 370°C | 'Aged' Activity Activity (F/W hr$^{-1}$) at 370°C after aging at 500°C for 24 hrs. |
|---|---|---|
| JXAC (UCC, Petroleum Coke derived, acid washed) | 3.3 | 1.6 |
| PCB (Pittsburg Carbon Co., coconut derived, non acid washed). | 5.0 | 2.2 |
| TS(987), UCC Coconut, non acid washed) | 5.7 | 2.4 |
| CXAC (UCC, Petroleum Coke, acid washed) | 4.6 | 3.5 |

Various modifications may be made without deviating from the spirit of the invention and, accordingly, the attached claims are considered to define the scope of the invention.

What is claimed is:

1. In a process for the production of cyanuric chloride by passing cyanogen chloride in the vapor phase over an activated carbon catalyst, the improvement which comprises contacting said cyanogen chloride with a untreated carbon catalyst derived from coconut, said catalyst having an inner surface of about 1,200 to 1,500 sq. meters per gram, an internal micropore volume of at least 0.7 cc per gram and an ash content below 4.0 percent by weight.

2. The process of claim 1 wherein said ash content is below about 2.0 percent by weight.

* * * * *